(12) United States Patent
Hughes (10) Patent No.: US 12,372,476 B2
(45) Date of Patent: Jul. 29, 2025

(54) COMPACT-CROSS DIRECTION C-FRAME SCANNER

(71) Applicant: Honeywell International Inc., Charlotte, NC (US)

(72) Inventor: Michael Hughes, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 17/985,276

(22) Filed: Nov. 11, 2022

(65) Prior Publication Data

US 2024/0159685 A1   May 16, 2024

(51) Int. Cl.
G01N 21/89 (2006.01)
G01N 21/93 (2006.01)

(52) U.S. Cl.
CPC ......... G01N 21/8901 (2013.01); G01N 21/93 (2013.01)

(58) Field of Classification Search
CPC ......... G01N 27/227; G01N 2015/1006; G01N 33/497; G01N 15/1434; G01N 21/1702; G01N 15/1433; G01N 2015/1452; G01N 27/4146; G01N 35/0099; G01N 2015/1486; G01N 35/10; G01N 15/1023; G01N 15/1429; G01N 35/1011; G01N 1/38; G01N 2030/965; G01N 30/96; G01N 2015/1454; G01N 2021/0346; G01N 21/6458;
(Continued)

(56) References Cited

U.S. PATENT DOCUMENTS 3,191,034 A * 6/1965 Cherkas ............... G01N 23/16
378/55
3,729,619 A   4/1973 Laycak et al.
(Continued)

FOREIGN PATENT DOCUMENTS

CN   106152952 B   10/2017
DE   102015108076 A1 * 11/2016   ......... G01B 11/0691
(Continued)

OTHER PUBLICATIONS

Web Gauging Solutions, ThermoFischer Scientific, Jan. 2010.

*Primary Examiner* — Michael P Stafira
(74) *Attorney, Agent, or Firm* — Seager, Tufte & Wickhem, LLP (57) ABSTRACT

A compact C-shaped scanner employs at least two sensors and has a mechanism to standardize or calibrate the sensors. The upper and lower elongated beams of the C-frame include a mid-beam sensor and an outer beam sensor. The scanner can monitor the entire width of a continuous sheet by advancing the scanner back and forth along a scanning distance that is only about half that of the sheet width thereby minimizing the required offsheet distance by an amount approaching half the width of the sheet being monitored. Standardization tiles consisting of references materials that are positioned laterally from the edges of the moving sheet allow for calibration of the sensors which operate either in the transmissive or reflective mode. Selected sheet properties or characteristics of the sheet material can be measured. The two sensors can operate in the transmissive or four sensors can operate in the reflective mode.

20 Claims, 5 Drawing Sheets

(58) Field of Classification Search
CPC ....... G01N 2021/6439; G01N 21/6428; G01N 24/10; G01N 27/125; G01N 35/00029; G01N 35/00871; G01N 21/47; G01N 33/54366; G01N 33/54386; G01N 1/2205; G01N 21/49; G01N 2570/00; G01N 15/1436; G01N 2021/0382; G01N 2021/513; G01N 2027/222; G01N 2035/00039; G01N 2035/00306; G01N 2035/0401; G01N 2035/103; G01N 2035/1032; G01N 21/6452; G01N 21/86; G01N 27/02; G01N 27/22; G01N 33/54373; G01N 33/54388; G01N 33/6842; G01N 33/76; G01N 35/04; G01N 21/658; G01N 23/00; G01N 30/02; G01N 33/346; G01N 33/5091; G01N 33/84; G01N 9/24; G01N 15/1459; G01N 2015/144; G01N 21/64; G01N 21/94; G01N 23/046; G01N 27/228; G01N 33/2823; G01N 1/2226; G01N 2021/6417; G01N 2021/6421; G01N 2035/00326; G01N 21/05; G01N 21/3504; G01N 21/359; G01N 2291/0234; G01N 23/16; G01N 30/92; G01N 1/2035; G01N 15/0227; G01N 2015/0294; G01N 2015/1493; G01N 2015/1497; G01N 2021/7786; G01N 21/253; G01N 21/65; G01N 21/8901; G01N 2291/0231; G01N 2291/0232; G01N 24/08; G01N 2610/00; G01N 27/18; G01N 29/4454; G01N 33/0004; G01N 33/0036; G01N 33/5088; G01N 33/574; G01N 35/08; G01N 21/03; G01N 25/72; G01N 27/4071; G01N 3/56; G01N 33/48707; G01N 33/502; G01N 33/5082; G01N 33/5308; G01N 33/543; G01N 1/30; G01N 1/40; G01N 15/1484; G01N 2001/2833; G01N 2021/6471; G01N 2035/00881; G01N 21/17; G01N 21/6489; G01N 21/8851; G01N 21/952; G01N 2291/2634; G01N 27/221; G01N 27/4067; G01N 29/2437; G01N 33/0047; G01N 33/483; G01N 33/4975; G01N 33/588; G01N 35/1095; G01N 1/2813; G01N 1/4077; G01N 2001/1025; G01N 2001/2826; G01N 2035/00089; G01N 2035/00138; G01N 2035/0405; G01N 2035/0427; G01N 2035/0441; G01N 2035/0443; G01N 2035/0458; G01N 2035/0462; G01N 35/00; G01N 35/021; G01N 35/1016; G01N 23/04; G01N 21/3581; G01N 21/89; G01N 33/367; G01N 2021/8663; G01N 2021/8917; G01N 21/8915; G01N 21/8983; G01N 22/02; G01N 1/286; G01N 1/36; G01N 2001/368; G01N 2021/8645; G01N 21/01; G01N 21/93; G01N 21/8806; G01N 2223/03; G01N 2223/308; G01N 2223/33; G01N 2223/642; G01N 23/02; G01N 2021/1706; G01N 21/274; G01N 23/083; G01N 29/22; G01N 29/225; G01N 29/2418; G01N 33/24; G01N 15/0205; G01N 15/06; G01N 15/075; G01N 17/008; G01N 2015/0003; G01N 2015/1027; G01N 2015/1447; G01N 2015/145; G01N 2291/048; G01N 2291/267; G01N 23/18; G01N 29/11; G01N 2021/8416; G01N 2021/869; G01N 2021/8908; G01N 2021/8918; G01N 2021/8925; G01N 21/6402; G01N 21/88; G01N 21/8903; G01N 21/892; G01N 21/9515; G01N 2223/401; G01N 2223/419; G01N 2223/628; G01N 2291/101; G01N 23/12; G01N 2333/12; G01N 2333/35; G01N 2333/445; G01N 2333/545; G01N 2333/57; G01N 2333/96486; G01N 27/9006; G01N 27/9013; G01N 29/06; G01N 29/07; G01N 33/533; G01N 33/56977; G01N 33/68

See application file for complete search history.

(56) References Cited

U.S. PATENT DOCUMENTS

| | | | | |
|---|---|---|---|---|
| 3,766,386 | A * | 10/1973 | Sivilotti | G01N 23/083 250/359.1 |
| 4,277,177 | A * | 7/1981 | Larsen | G01N 21/86 356/243.4 |
| 5,327,770 | A | 7/1994 | Hindle | |
| 5,569,835 | A * | 10/1996 | Kenney | G01B 5/0014 702/170 |
| 7,298,492 | B2 | 11/2007 | Tixier | |
| 8,527,212 | B2 | 9/2013 | Hughes et al. | |
| 9,182,360 | B2 | 11/2015 | Tixier et al. | |
| 9,891,164 | B2 | 2/2018 | Tixier | |
| 9,927,366 | B2 | 3/2018 | Tixier et al. | |
| 10,072,922 | B2 | 9/2018 | Tixier et al. | |
| 10,281,318 | B1 | 5/2019 | Lawrence | |
| 11,255,659 | B2 | 2/2022 | Hughes et al. | |
| 2015/0177155 | A1* | 6/2015 | Haran | G01N 21/3581 250/341.1 |
| 2015/0323375 | A1* | 11/2015 | Meijer Drees | G01N 23/16 250/359.1 |
| 2016/0265901 | A1* | 9/2016 | Kyriakis | G01B 11/0691 |
| 2019/0285527 | A1* | 9/2019 | Tixier | G01N 33/346 |
| 2020/0096308 | A1 | 3/2020 | Hughes et al. | |
| 2020/0371040 | A1* | 11/2020 | Young, Jr. | G01N 21/892 |
| 2021/0262776 | A1 | 8/2021 | Tixier et al. | |
| 2021/0382173 | A1 | 12/2021 | Hughes et al. | |
| 2022/0305516 | A1* | 9/2022 | Lee | G01N 25/72 |

FOREIGN PATENT DOCUMENTS

| | | | | |
|---|---|---|---|---|
| DE | 102018105011 A1 * | 9/2019 | ......... | G01B 11/0675 |
| EP | 0094669 A1 * | 11/1983 | | |
| EP | 0522711 A2 * | 1/1993 | | |
| JP | H07159202 A | 6/1995 | | |
| JP | H10300433 A | 11/1998 | | |
| JP | 2902922 B2 * | 6/1999 | | |
| JP | 2003227708 A | 8/2003 | | |
| JP | 2015190926 A | 11/2015 | | |
| JP | 2021135288 A * | 9/2021 | ......... | G01B 11/0691 |
| JP | 2021165106 A | 10/2021 | | |
| KR | 20160071488 A * | 6/2016 | | |
| WO | WO-2016198690 A1 * | 12/2016 | ............. | G01B 11/06 |

* cited by examiner

COMPACT-CROSS DIRECTION C-FRAME SCANNER

FIELD OF THE INVENTION

The present invention generally relates to scanner measurement systems for determining parameters of continuous sheet materials and, more particularly, to a non-contacting measurement system employing a C-frame scanner with standardization tiles for calibrating the sensors and wherein the scanning operations of the system require significantly less offsheet displacement distance or space as compared to conventional C-frame scanners.

BACKGROUND OF THE INVENTION

Scanner systems are employed to measure properties of continuously moving webs or sheets. Typically, a source of radiation and a detector are mounted on a head supported for reciprocal movement on a beam or frame which spans a continuously produced web. The head is caused to reciprocate over the web approximately at right angles to the direction of web movement, with the head moving at a constant speed across the web. The beam or frame supporting the head may be a straight single beam which passes over the path of the web movement, and which supports the source of radiation and the detector. Alternatively, the scanner can have a C-shaped or O-shaped frame which encompasses the path of web movement so that the source and detector can be on opposite faces of the web.

With most O-shaped scanners, the frame is stationery and the dual heads traverse back and forth in the cross direction over the moving web. O-shaped scanner are particularly suited for industrial processes where the web or sheet can be tens of meters in width such as in the production of paper.

In contrast, during operation of a C-shaped scanner, the entire frame moves back and forth in the cross direction over the moving web. In this fashion, the upper and lower heads which are aligned and secured to the upper and lower arms, respectively, are able to scan the moving web from edge to edge. C-shaped scanners are particularly suited for applications where the moving web is relatively narrow in width such as in the production of anodes and cathodes for lithium-ion batteries in facilities where floor space is limited. The versatility of current C-shaped scanners, however, is restricted by their design which requires that the frame must move a distance that is equal to at least the width of the web being monitored.

SUMMARY OF THE INVENTION

The present invention is based in part on the development of a compact C-shaped scanner which employs two or more sensors and which has a mechanism to standardize or calibrate the sensors. The scanner can monitor the entire width of a continuous sheet by advancing the scanner back and forth along a scanning distance that is equal to only about half that of the sheet width. The present invention reduces the required offsheet scanner displacement distance by an amount approaching half the width of the sheet being monitored.

In one aspect, the invention is directed to system for monitoring a property or characteristic of a continuous sheet of material that travels in a machine direction (MD) and wherein the sheet has a first side and a second side which includes:

a first member disposed adjacent to the first side of the sheet, wherein the first member has a first proximal end and a first distal end, and has (i) a first sensor means for measuring a property of the sheet and which is positioned at the first distal end, and (ii) a second sensor means for measuring a property of the sheet and which is positioned between the first proximal end and the first distal end;

a second member disposed adjacent to the second side of the sheet wherein the second member has a second proximal end and a second distal end and wherein the first member and second member are parallel and define a measurement gap through which the continuous sheet of material travels; and means for driving the first member and second member back and forth along a cross direction (CD), which is perpendicular to the MD, so that the first sensor and second sensor measure a property of the sheet at a plurality of locations of the sheet of material.

In another aspect, the invention is directed to a sensor apparatus that includes:

a C-frame comprising a support with a first arm or beam and a second arm or beam that are parallel and define a measurement gap which accommodates a moving sheet, wherein the first arm has a first proximal end and a first distal end and the second arm has a second proximal end and a second distal end wherein;

a first sensor that is mounted on a first position of the first arm and a second sensor that is mounted on a second position of the first arm wherein the first and second sensors are spaced laterally apart along the length of the first arm;

a first standardization tile or plate;

a second standardization tile or plate which is spaced laterally apart from the first standardization tile;

first means for maneuvering the C-frame laterally back and forth along a scanning path such that the first sensor measures a characteristic of the sheet between a first edge of the sheet to a mid-region of the sheet and the second sensor measures a characteristic of the sheet between the mid-region of the sheet to a second edge of the sheet; and second means for maneuvering the C-frame along the scanning path to a first calibration position where the first standardization tile calibrates the first sensor and to a second calibration position where the second standardization tile calibrates the second sensor. The tiles or plates include stable reference materials whose properties are known and which simulate the sheet material.

In a further aspect, the invention is directed to a method of measuring process variables in a continuous sheet or web process which has a machine direction and a cross direction, which includes:

providing a first elongated member that supports a first sensor and a second sensor wherein the first and second sensors are separated laterally along the first elongated member;

directing a continuous moving sheet of material along a machine direction wherein the sheet has a first side and a second side and a first edge and a second edge and wherein the first elongated member is positioned along a CD adjacent to the continuous moving sheet of material;

maneuvering the first elongated member back and forth between a first scanning position and a second scanning position such that the first sensor measures a property of the sheet between the first edge and a mid-region of the sheet of material and the second sensor measures a property of the sheet between the mid-region and the second edge;

positioning a first standardization tile adjacent to the first edge;

positioning a second standardization tile adjacent to the second edge;

maneuvering the first elongated member to a first calibration position wherein the first sensor obtains reference measurements using the first standardization tile; and maneuvering the first elongated member to a second calibration position wherein the second sensor obtains reference measurements using the second standardization tile.

The sensors can be secured to the elongated members or beams or the sensor components can be integrated into the members of the C-frame. The scanning system can be employed to detect characteristics of materials such as paper, plastic, thin metal substrates, fabrics and the like. The sensors can operate either in the transmissive or reflective mode. By periodically traversing back and forth across a continuously moving material, values of selected sheet properties such as basis weight, caliper, moisture content, composition and temperature can be measured. The moving sheet being monitored is traversed from edge to edge during each scan

DETAILED DESCRIPTION OF THE PREFERRED EMBODIMENTS

Figure 1:
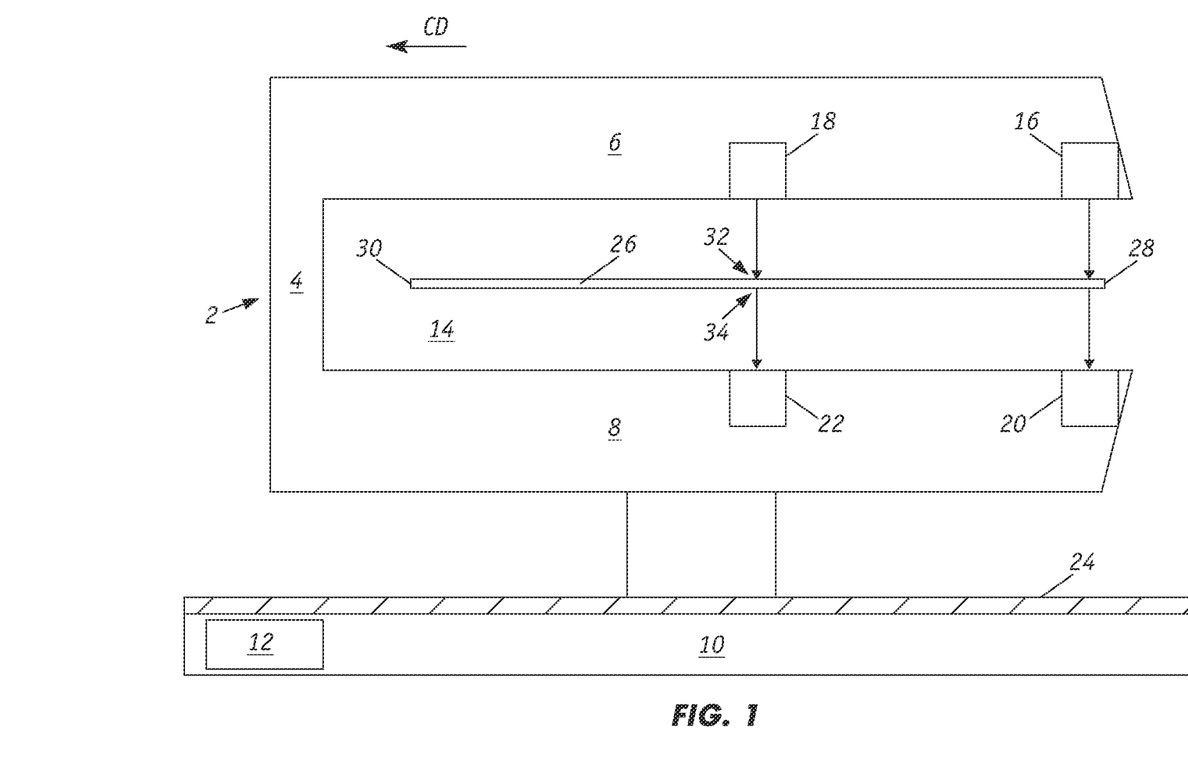
FIGS. 1 and 2 are cross sectional views of an online scanning system with scanner heads mounted to a C-frame structure that is transported on the translation mechanism.

FIG. 1 illustrates a scanning sensor system 2 that includes a vertical support 4 that secures the proximal ends of an upper elongated arm 6 and a lower elongated arm 8 which are parallel to each other. The lower arm 8 is movably secured to a translation mechanism 10 that includes a servomotor 12 and a linear slide or rail 24. The upper arm 6 has a sensor 16 that is mounted at its distal end and a sensor 18 that is mounted at a location towards its proximal end. Similarly, the lower arm 8 has a sensor 20 that is mounted at its distal end and a sensor 22 that is mounted at a location toward its proximal end. The vertical support and elongated arms can be constructed as a unitary structure. Sensors 16 and 20 are aligned along a vertical axis and sensors 18 and 22 are aligned another vertical axis.

The upper and lower arms define a measurement gap or channel 14 that accommodates a continuous moving web or sheet 26 that is being monitored. The web or sheet 26 travels downstream in a machine direction (MD). The servomotor 12 drives a drive belt, cable or chains to advance the C-frame back and forth along the cross direction (CD), which is perpendicular to the MD. In the process, sensors 16 and 18 scan across the upper side of the web or sheet 26 while sensors 20 and 22 scan across the lower side of web or sheet 26 With the dual sensors mounted on each of the elongated arms, the C-frame only needs to travel approximately half the width of the web or sheet 26 in order to monitor the entire web or sheet of material from edge to edge As described herein, the C-frame advances back and forth between a fully-inserted position and a fully-retracted position.

As shown in FIG. 1, the scanning sensor system 2 is in the fully-inserted position with the upper and lower arms 6, 8 enclosing the measurement gap 14. The outer sensor 16 is positioned so that it measures a property on the upper surface of the material at or near outer edge 28 of the web or sheet 26 whereas mid sensor 18 is positioned so that it measures a property of the material at the midpoint 32 along the width of web or sheet 26 which is equal distance from edges 28 and 30. It is preferred that the mid sensor 18 be spaced laterally apart from sensor 16 by a distance equal to half the CD width of the sheet. Similarly, outer sensor 20 is positioned so that it measures a property on the bottom surface of the material at or near edge 28 of the web or sheet 26 whereas mid sensor 22 is positioned so that it measures a property of the material at the midpoint 34 along the width of web or sheet 26 which is equal distance from edges 28 and 30. It is preferred that the mid sensor 22 be spaced laterally apart from sensor 20 by a distance equal to half the CD width of the sheet. From this initial scanning position, as the C-frame moves backward along the CD, sensor 16 scans over top surface of the material from edge 28 to midpoint 32 while sensor 18 scans from midpoint 32 to edge 30. Simultaneously, sensor 20 scans over lower surface of the material from edge 28 to midpoint 34 while sensor 22 scans from midpoint 34 to edge 30.

Figure 2:
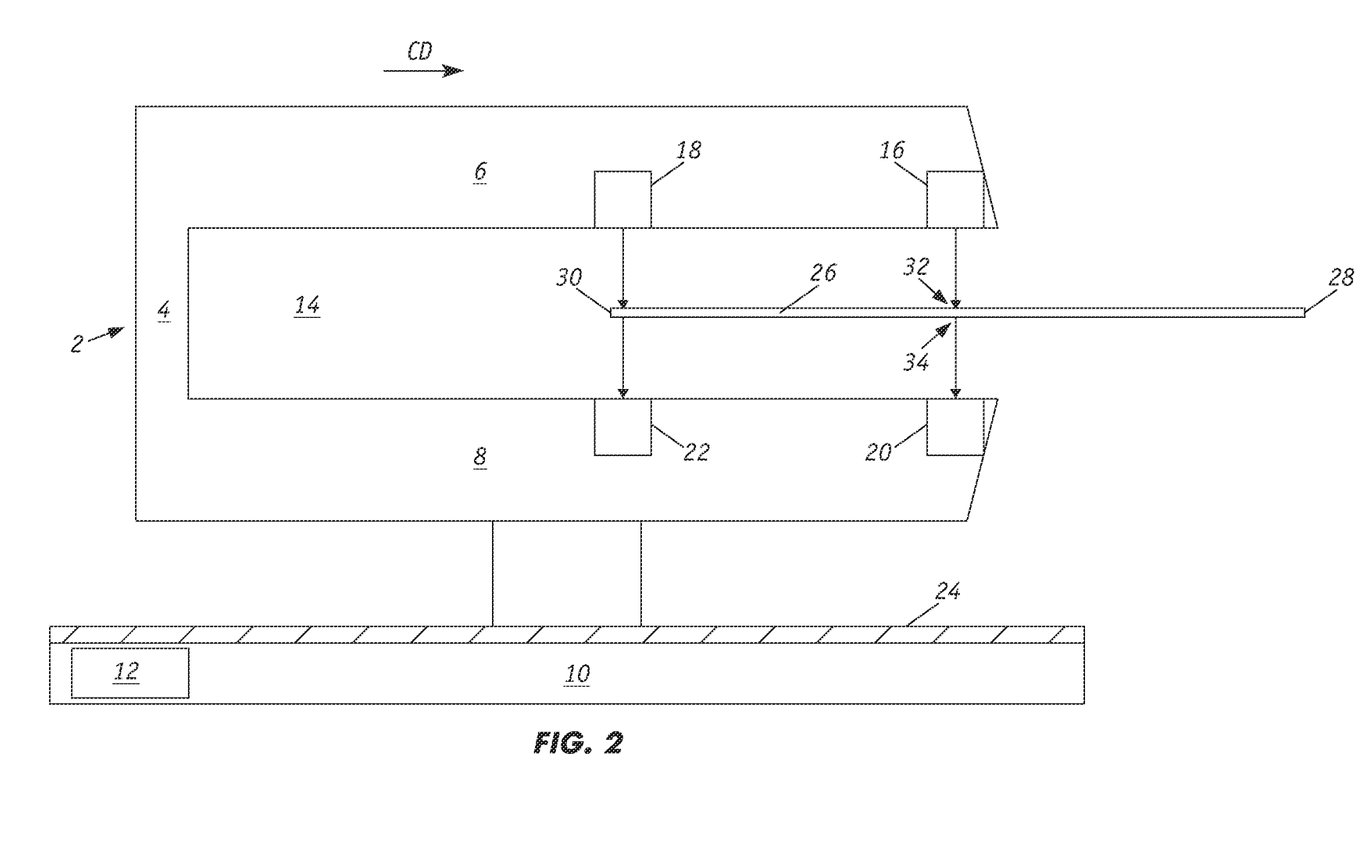

FIG. 2 depicts the scanning sensor system 2 having moved to the fully retracted position wherein the C-frame has stopped momentarily before reversing directions to advance forward on rail 24 along the CD. The outer sensor 16 is now positioned so that it measures a property on the upper surface of the material at the midpoint 32 of the web or sheet 26 whereas mid sensor 18 is now positioned so that it measures a property of the material at or near inner edge 30. Similarly, outer sensor 20 is now positioned so that it measures a property on the bottom surface of the material at the midpoint 34 of the web or sheet 26 whereas mid sensor 22 is now positioned so that it measures a property of the material at the or near inner edge 30. From this retracted scanning position, as the C-frame reverses directions and moves forward along the CD, sensor 16 scans over the top surface of the material from midpoint 32 to edge 28 while sensor 18 scans the top surface from edge 30 to midpoint 32. Simultaneously, sensor 20 scans over the lower surface of the material from midpoint 34 to edge 28 while sensor 22 scans from edge 30 to the midpoint 34.

For the scanning sensor system 2 shown in FIGS. 1 and 2, the sensors are depicted as operating in the transmissive mode. For instance, sensors 16 and 18 can each comprise a radiation source that directs a beam of radiation into a moving web or sheet 26 and sensors 20 and 22 can each comprise a radiation receiver that detects radiation that is transmitted through the material The two sets of sensors operate to measure one or more properties of the web or sheet 26. As the C-frame advances back and forth along the CD, the sensors 16 and 20 measure one or more properties of the web or sheet 26 from edge 28 to midpoint 32 and sensors 18 and 22 measure the same one or more properties of the web or sheet 26 between midpoint 32 and edge 30 Sensors operating in the transmission mode are described, for instance, in U.S. Pat. No. 9,182,360 to Tixier and Hughes, U.S. Pat. No. 8,527,212 to Hughes and Tixier, U.S. Pat. No. 7,298,492 to Tixier, US 2021/0382173 to Hughes et al. and US 2021/0262776 to Tixier and Hughes, which are incorporated herein by reference.

Alternatively, the sensors of the scanning sensor system 2 can operate in the reflective mode. For instance, each of sensors 16 and 18 can comprise both a radiation source and detector to measure one or more characteristics of the web or sheet 26. In this arraignment, as the C-frame advances back and forth along the CD, sensor 16 measures one or more properties of the web or sheet 26 between edge 28 and midpoint 32 and sensor 18 measure the same one or more properties of the web or sheet 26 between midpoint 32 and edge 30. Furthermore, in this reflective mode arrangement, each of sensors 20 and 22 can also comprise both a radiation source and detector to measure one or more characteristics of the web or sheet 26. As the C-frame advances back and forth along the CD, sensor 20 measures one or more properties of the web or sheet 26 between edge 28 and midpoint 34 and sensor 22 measure the same one or more properties of the web or sheet 26 between midpoint 34 and edge 30. As is apparent, the upper sensors 16 and 18 can be configured to measure properties that are different from the properties measured by the lower sensors 20 and 22. Sensors operating in the reflective mode are described, for instance, in in U.S. Pat. Nos. 9,182,360, 8,527,212, 7,298,492 and US2020/0096308 to Hughes et al., which are incorporated herein by reference. The sensors can also comprise a combination of reflective and transmissive sensors.

Figure 3:
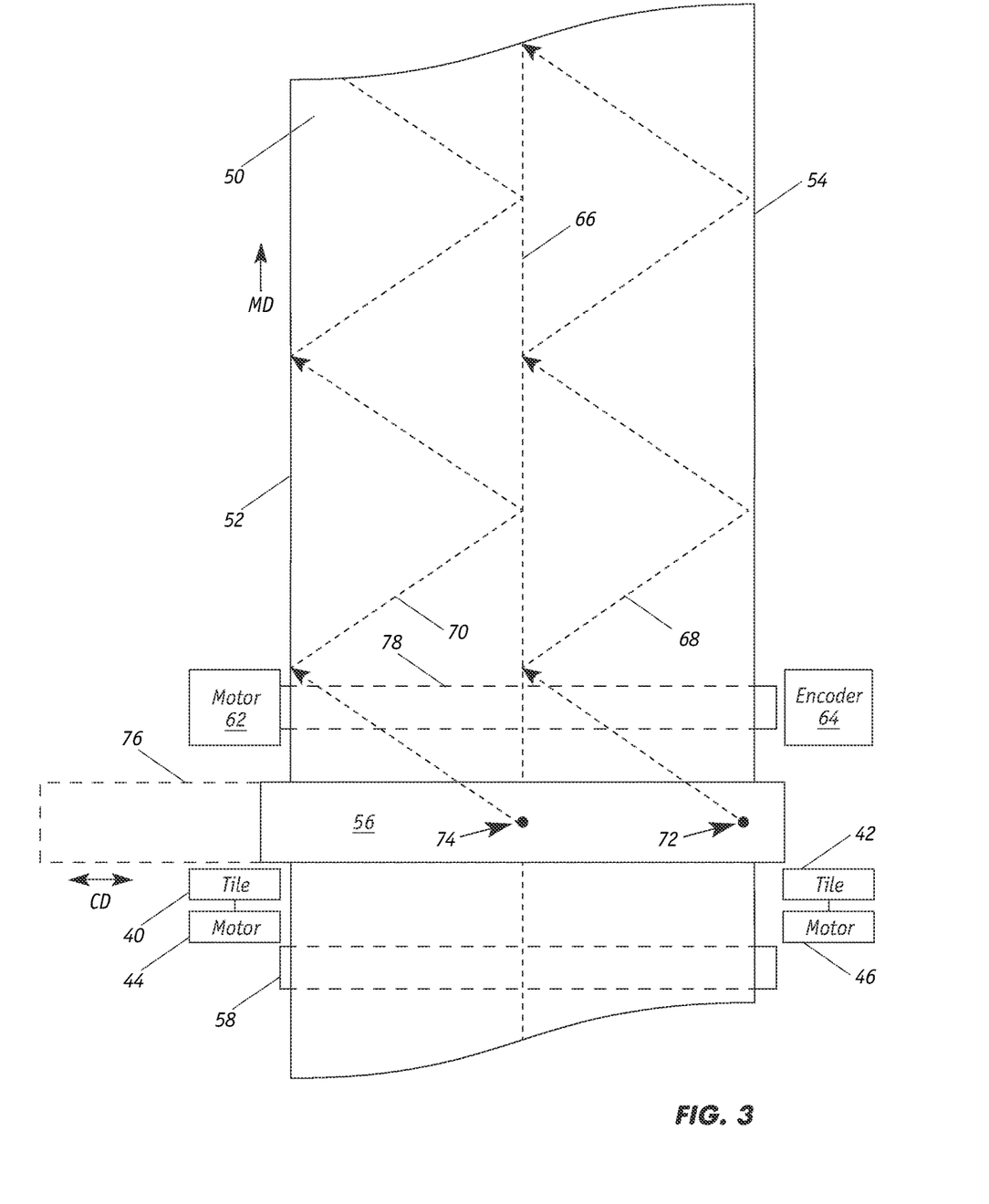
FIG. 3 is a plan view illustrating the operations of a scanning sensor system.

FIG. 3 illustrates the operation of a scanning sensor system that includes C-frame 56 in monitoring a moving sheet 50 by measuring one or more characteristics thereof as the sheet 50 travels in the MD A pair of rollers 58, 78 support and guide the continuous sheet 50. Motor 62 operates roller 78 and encoder 64 monitors its speed. As C-frame 56 periodically traverses sheet 50 generally at a constant speed, the two pairs of gauges (that is, sensors 16, 20 and 18, 22 as shown in FIGS. 1 and 2), measure interrogation spots or areas 72 and 74, respectively. The spots 72 and 74 are separated laterally by a fixed, offset distance. For this illustration, the sensors are configured to operate in the transmission mode The C-frame 56 is movable between the fully-retracted position that is represented by the dotted line 76 and the fully-inserted positioned shown by the solid line 56 The C-frame travels a distance equal to the offset distance between spots 72 and 74 as it periodically scans between the fully-retracted position and the fully-inserted position.

The two sensors do not measure selected properties at locations which are aligned exactly perpendicular to the longitudinal edges 52, 54 of sheet 50. Instead, because of the sheet velocity, the scanning C-frame travels diagonally across the substrate surface, with the result that consecutive scanning paths have a zig-zag pattern with respect to the direction perpendicular to the longitudinal edges 50, 54

As examples of such zig-zag patterns are scanning measurements paths or profiles 68 and 70 which would be traced by the two pairs of gauges as the C-frame traverses the surface of sheet 50 during the back-and-forth consecutive scans. The angles of each of the scanning paths relative to the true CD depend upon the cross-directional velocity of the scanning device and upon the machine-directional velocity of the substrate 60 which is known. The each of the two zig-zag patterns covers a relatively small portion of the substrate surface, with measurement profile 68 covering the sheet between edge 52 and midline 66 and measurement profile 70 covering the sheet between midline 66 and edge 55.

If the C-frame 76 has four sensors operating in the reflective mode, with each elongated arm supporting dual sensors, then each of the four sensors generates a separate zig-zag measurement profile.

Standardization tile or plate 40 is connected to motor 44 and standardization tile or plate 42 is connected motor 46. When the system 56 is operating in the calibration mode, each tile can be pivoted by rotation of a shaft which is driven through a universal point by a rotary solenoid unit. It is understood that each standardization tile 40 and 42 can represent a plurality of tiles with reference materials, such as plastic films, having different known properties so as to permit recalibration through a range of simulated property levels. The stable reference material can be stored in tile or plate-shaped compartment which has a spring-loaded plastic cover; a solenoid pulls the cover out to expose the reference material when during calibration.

Instead of being connected to the motors as shown in FIG. 3, the standardization tiles 40 and 42 can be positioned permanently in place juxtaposed to the edges 52 and 54, respectively. The tiles are available whenever recalibration of the sensors is needed.

In the case where the sensors are operating in the reflective mode, each standardization tile is preferably configured to calibrate an upper sensor and a lower sensor simultaneously. The tile includes a reflective metal having reference materials secured to each side of the reflective metal.

Figure 4:
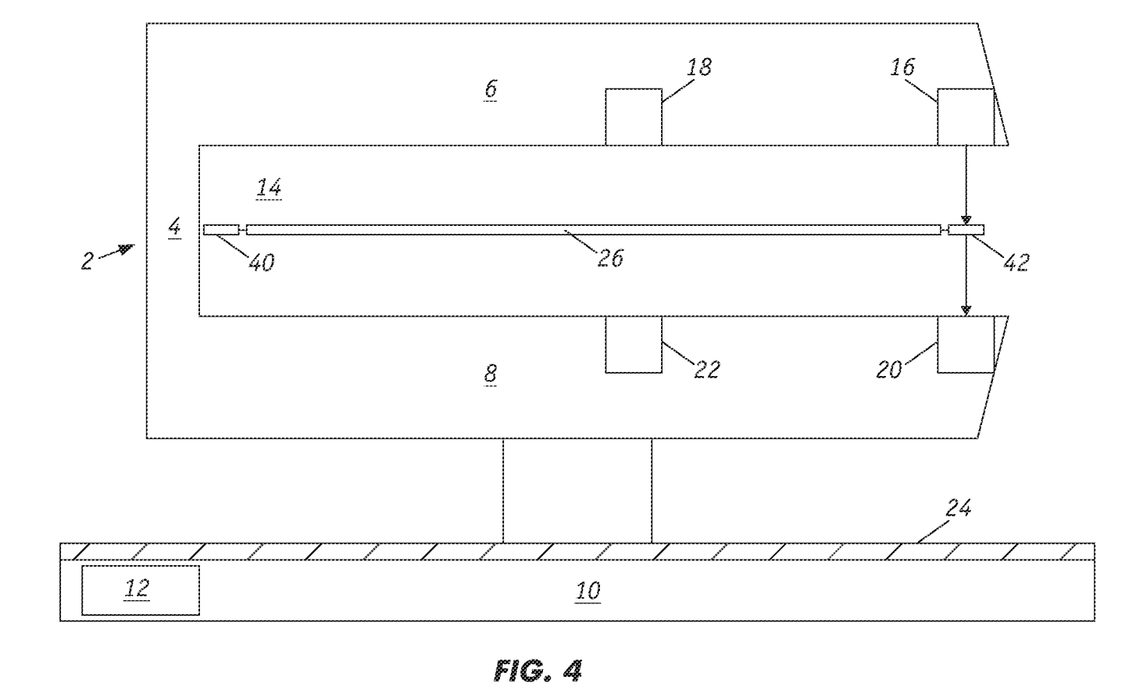
FIGS. 4 and 5 are cross sectional views of an online scanning system equipped with standardization tiles or plates which are made of reference materials and that are positioned on either side of a moving film or substrate and operating in the calibration mode.
Figure 5:
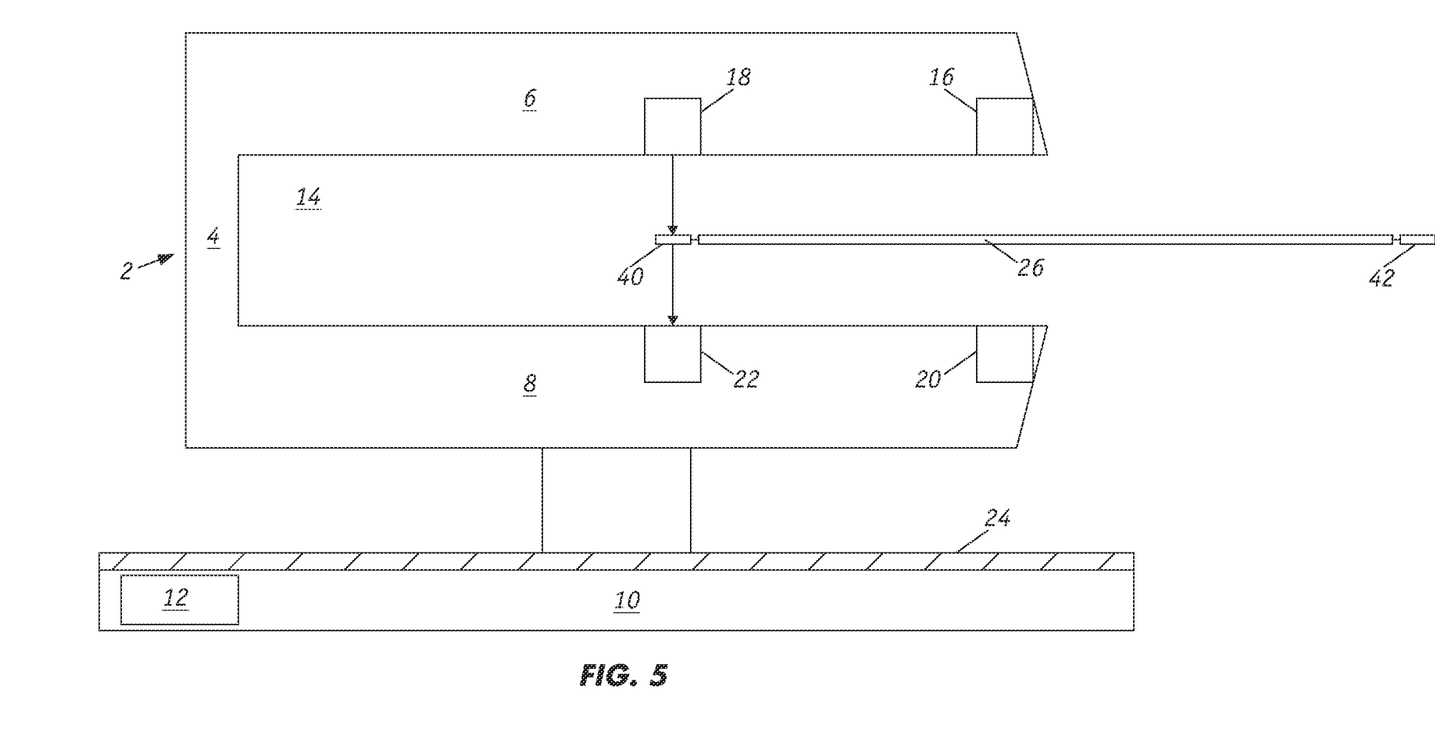

As shown in FIG. 4, the standardization tile 42 is maneuvered with motorized mechanism 46 (FIG. 3) into a position adjacent to the outer edge of sheet 26 and standardization tile 40 is maneuvered with motorized mechanism 44 (FIG. 3) into position adjacent to the inner edge of sheet 26. In this inserted calibration position the standardization tile 42 is positioned in tandem between outer sensors 16 and 20. The scanning sensor system 2 as shown in FIG. 5 is in the retracted calibration position, wherein standardization tile 40 is positioned in tandem between mid-sensors and 18 and 22.

Typically, in the case where the sensors are operating in the transmission mode, after source 16 and detector 20, for instance, of FIG. 1 have been assembled at the factory, they are first calibrated by establishing "reference" values through sensor measurements of a selected property such as thickness where no sample is present in the gap between the radiation source 16 and detector 20. Next, the sensor is calibrated empirically by positioning successive actual samples with known property (e.g., thickness) levels into the gap. A calibration curve, look-up table, and/or mathematic model (collectively referred as "calibration data") that express the calculated sheet thickness levels as a function of measured radiation by the detector is generated and stored in the computer memory. When the sensor is installed at a facility, it is ready for use by the customer.

During scanning operations, each of standardization tiles 40, 42 allows for periodic on-line recalibration of the sensors. A stable calibration reference material is selected to simulate the sheet material. With the present invention, standardization or recalibration of the sensors 16 and 20, for example, can be based on readings from the sensors with a standardization tile.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system for monitoring a characteristic of a sheet of material that travels in a machine direction, the system comprising:
    a first member disposed adjacent to a first side of the sheet, wherein the first member has a first proximal end and a first distal end, and has (i) a first sensor positioned at the first distal end, and (ii) a second sensor positioned between the first proximal end and the first distal end;
    a second member disposed adjacent to a second side of the sheet wherein the second member has a second proximal end and a second distal end, and wherein the first member and the second member are parallel and define a measurement gap through which the sheet of material travels; and
    driving means for driving the first member and the second member back and forth along a scanning path such that the first sensor measures a characteristic of the sheet from a first edge of the sheet to a mid-point of the sheet along a width of the sheet and the second sensor measures a characteristic of the sheet from the mid-point of the sheet to a second edge of the sheet.

2. The system of claim 1 wherein the first member and the second member are secured to a frame such that the first member, the second member and the frame form a unitary structure that is driven by said driving means.

3. The system of claim 1 comprising a first standardization tile that is configured to calibrate the first sensor and a second standardization tile that is configured to calibrate the second sensor.

4. The system of claim 3 wherein the first standardization tile is positioned adjacent to the first edge of the sheet of material and the second standardization tile is positioned adjacent to the second edge of the sheet of material.

5. The system of claim 1 wherein the second sensor is positioned midway between the first proximal end and the first distal end of the first member.

6. The system of claim 1 wherein the first sensor comprises a first source that directs a first radiation into the sheet of material and the second sensor comprises a second source directs a second radiation into the sheet of material and wherein the second member has (i) a first detector for receiving the first radiation that is transmitted through the sheet of material and (ii) a second detector for receiving the second radiation that is transmitted through the sheet of material.

7. The system of claim 6 wherein the second sensor is positioned midway between the first proximal end and the first distal end of the first member and the second detector is positioned midway between the second proximal end and the second distal end of the second member.

8. The system of claim 6 comprising a first standardization tile that is configured to calibrate the first source and the first detector and a second standardization tile that is configured to calibrate the second source and the second detector.

9. The system of claim 8 wherein the first source is aligned with the first detector along a first axis and the second source is aligned with the second detector along a second axis and wherein said driving means positions the first source and the first detector adjacent to the first standardization tile so that the first source, the first detector and the first standardization tile are arranged in tandem during a first calibration and wherein said driving means positions the second source and the second detector adjacent to the second standardization tile so that the second source, the second detector and the second standardization tile are arranged in tandem during a second calibration.

10. The system of claim 1 wherein the first sensor comprises a first source and a first detector, wherein the first source directs a first radiation toward the first side and the first detector detects a first reflected radiation that is reflected from the first side and the second sensor comprises a second source and a second detector, wherein the second source directs a second radiation toward the first side and wherein the second detector detects a second reflected radiation that is reflected from the first side.

11. The system of claim 10 comprising a first standardization tile that is configured to calibrate the first source and the first detector and a second standardization tile that is configured to calibrate the second source and the second detector.

12. The system of claim 10 wherein the second member has (i) a third sensor that comprises a third source and a third detector, wherein the third source directs a third radiation toward the second side and the third detector detects a third reflected radiation that is reflected from the second side and (ii) a fourth sensor that comprises a fourth source and a fourth detector, wherein the fourth source directs a fourth radiation toward the second side and the fourth detector detects a fourth reflected radiation that is reflected from the second side and wherein the driving means drives the first member and the second member back and forth along a cross direction so that the first sensor and the second sensor measure a first property of the sheet from a plurality of locations on the first side and the third sensor and fourth sensor measure a second property of the sheet from a plurality of locations on the second side.

13. The system of claim 12 comprising a first standardization tile that is configured to calibrate the (i) the first source and the first detector and (ii) the third source and the third detector and a second standardization tile that is configured to calibrate the (i) the second source and the second detector and (ii) the fourth source and the fourth detector.

14. The system of claim 13 wherein the first sensor is aligned with the third sensor along a first axis and the second sensor is aligned with the fourth sensor along a second axis and wherein said driving means positions the first sensor and the third sensor adjacent to the first standardization tile so that the first sensor, the third sensor and the first standardization tile are arranged in tandem during a first calibration and wherein said driving means positions the second sensor and the fourth sensor adjacent to the second standardization tile so that the second sensor, the fourth sensor and the second standardization tile are arranged in tandem during a second calibration.

15. A sensor apparatus comprising:
    a C-frame comprising a support with a first arm and a second arm that define a measurement gap that accommodates a sheet, wherein the first arm has a first proximal end and a first distal end and the second arm has a second proximal end and a second distal end;
    a first sensor that is mounted on a first position of the first arm and a second sensor that is mounted on a second position of the first arm, wherein the first and second sensors are spaced laterally apart along a length of the first arm;
    a first standardization tile;
    a second standardization tile which is spaced laterally apart from the first standardization tile;

first means for maneuvering the C-frame laterally back and forth along a scanning path such that the first sensor measures a characteristic of the sheet from a first edge of the sheet to a mid-point of the sheet along a width of the sheet and the second sensor measures a characteristic of the sheet from the mid-point of the sheet to a second edge of the sheet; and second means for maneuvering the C-frame along the scanning path to a first calibration position where the first standardization tile calibrates the first sensor and to a second calibration position where the second standardization tile calibrates the second sensor.

16. The sensor apparatus of claim 15 wherein the first sensor comprises a first radiation source and a first receiver and the second sensor comprises a second radiation source and a second receiver, the sensor apparatus further comprising a third sensor that is mounted on a third position of the second arm and a fourth sensor that is mounted on a fourth position on the second arm, wherein the third sensor and fourth sensor are spaced laterally apart along a length of the second arm, wherein the third sensor comprises a third radiation source and a third receiver and the fourth sensor comprises a fourth radiation source and a fourth receiver and wherein each of the first sensor, the second sensor, the third sensor and the fourth sensors is configured to operate in a reflective mode;

wherein the first means for maneuvering the C-frame moves the C-frame such that the first sensor measures a characteristic of a first side of the sheet between a first edge of the first side and a mid-region of the first side and the second sensor measures a characteristic of the first side between the mid-region and a second edge of the first side and the third sensor measures a characteristic of a second side between a first edge of the second side and a mid-region of the second side and the fourth sensor measures a characteristic of the second side between the mid-region of the second side and a second edge of the second side; and wherein the second means for maneuvering the C-frame moves the C-frame along the scanning path to the first calibration position where the first standardization tile calibrates the first sensor and the third sensor and to the second calibration position where the second standardization tile calibrates the second sensor and the fourth sensor.

17. The sensor apparatus of claim 15 wherein the first sensor comprises a first radiation source and the second sensor comprises a second radiation source and wherein the sensor apparatus further comprises a first radiation receiver that is mounted on a third position of the second arm and a second radiation receiver that is mounted on a fourth position of the second arm;

wherein the first means for maneuvering the C-frame moves the C-frame such that the first radiation source directs first radiation toward a first side between a first edge of the first side of the sheet of material to a mid-region of the first side and the first radiation receiver receives the first radiation that is transmitted through the sheet of material and the second radiation source directs second radiation toward the first side between the mid-region of the first side and a second edge of the first side and the second radiation receiver receives the second radiation that is transmitted through the sheet of material; and wherein the second means for maneuvering the C-frame moves the C-frame along the scanning path to the first calibration position where the first standardization tile calibrates the first radiation source and first radiation receiver and to the second calibration position where the second standardization tile calibrates the second radiation source and second radiation receiver.

18. A method of measuring process variables in a sheet process which has a machine direction and a cross direction, the method comprising:

(i) providing a first elongated member that supports a first sensor and a second sensor, wherein the first and second sensors are separated laterally along the first elongated member;

(ii) directing a sheet of material along the machine direction wherein the sheet has a first side and a second side and a first edge and a second edge and wherein the first elongated member is positioned along the cross direction adjacent to the sheet of material;

(iii) maneuvering the first elongated member back and forth between a first scanning position and a second scanning position such that the first sensor measures a property of the sheet from the first edge to a mid-point of the sheet of material along a width of the sheet and the second sensor measures a property of the sheet from the mid-point to the second edge;

(iv) positioning a first standardization tile adjacent to the first edge;

(v) positioning a second standardization tile adjacent to the second edge;

(vi) maneuvering the first elongated member to a first calibration position wherein the first sensor obtains reference measurements using the first standardization tile; and (vii) maneuvering the first elongated member to a second standardization position wherein the second sensor obtains the reference measurements using the second standardization tile.

19. The method of claim 18 wherein the first sensor comprises a first radiation source and the second sensor comprises a second radiation source and said method further comprises providing a second elongated member that supports a first radiation detector and a second radiation detector, wherein the first detector radiation and the second radiation detector are separated laterally along the second elongated member and wherein the first elongated member is parallel to the second elongated member; and wherein step (iii) includes maneuvering the second elongated member back and forth between the first scanning position and the second scanning position;

wherein step (v) includes maneuvering the second elongated member to the first calibration position; and wherein step (vii) includes maneuvering the second elongated member to the second standardization position.

20. The method of claim 18 further comprises providing a second elongated member that supports the second sensor and a third sensor, that are separated laterally along the second elongated member, wherein the first and second elongated members are parallel to each other and wherein each of the first, second, third and fourth sensors operate in a reflective mode; and wherein step (iii) includes maneuvering the second elongated member back and forth between the first scanning position and the second scanning position;

wherein step (v) includes maneuvering the second elongated member to the first calibration position wherein the first sensor and third sensor obtain the reference measurements using the first standardization tile; and wherein step (vii) includes maneuvering the second elongated member to the second standardization position wherein the second sensor and fourth sensor obtain the reference measurements using the second standardization tile.

\* \* \* \* \*